(12) United States Patent
Lemanski

(10) Patent No.: US 9,262,212 B2
(45) Date of Patent: Feb. 16, 2016

(54) SYSTEMS AND METHODS FOR MIGRATING VIRTUAL MACHINES

(71) Applicant: The Boeing Company, Seal Beach, CA (US)

(72) Inventor: Richard Matthew Lemanski, Glen Carbon, IL (US)

(73) Assignee: The Boeing Company, Chicago, IL (US)

( * ) Notice: Subject to any disclaimer, the term of this patent is extended or adjusted under 35 U.S.C. 154(b) by 162 days.

(21) Appl. No.: 13/667,807

(22) Filed: Nov. 2, 2012

(65) Prior Publication Data

US 2014/0130040 A1 May 8, 2014

(51) Int. Cl.
| | |
|---|---|
| *G06F 9/455* | (2006.01) |
| *G06F 9/46* | (2006.01) |
| *G06F 15/173* | (2006.01) |
| *G06F 9/48* | (2006.01) |
| *G06F 9/50* | (2006.01) |

(52) U.S. Cl.
CPC ............. *G06F 9/4856* (2013.01); *G06F 9/455* (2013.01); *G06F 9/48* (2013.01); *G06F 9/485* (2013.01); *G06F 9/4862* (2013.01); *G06F 9/4868* (2013.01); *G06F 9/4881* (2013.01); *G06F 9/50* (2013.01); *G06F 9/5083* (2013.01); *G06F 9/5088* (2013.01)

(58) Field of Classification Search
None
See application file for complete search history.

(56) References Cited

U.S. PATENT DOCUMENTS

| | | | |
|---|---|---|---|
| 8,099,391 | B1 | 1/2012 | Monckton |
| 2005/0198303 | A1* | 9/2005 | Knauerhase et al. ......... 709/227 |
| 2007/0208918 | A1 | 9/2007 | Harbin et al. |
| 2007/0244938 | A1 | 10/2007 | Michael et al. |
| 2009/0007105 | A1* | 1/2009 | Fries et al. ......................... 718/1 |
| 2009/0198805 | A1* | 8/2009 | Ben-Shaul et al. ........... 709/222 |
| 2009/0216970 | A1 | 8/2009 | Basler et al. |
| 2009/0216975 | A1* | 8/2009 | Halperin et al. .............. 711/162 |
| 2009/0313447 | A1* | 12/2009 | Nguyen et al. ................ 711/162 |
| 2010/0070870 | A1* | 3/2010 | Halperin et al. .............. 715/742 |
| 2010/0107163 | A1* | 4/2010 | Lee ................................... 718/1 |
| 2010/0262585 | A1 | 10/2010 | Rosikiewicz et al. |

(Continued)

FOREIGN PATENT DOCUMENTS

| | | |
|---|---|---|
| EP | 1962192 A1 | 8/2008 |
| EP | 2309387 A1 | 4/2011 |
| WO | 2013039481 A1 | 3/2013 |

OTHER PUBLICATIONS

Search Report of Application No. GB1318649; Mar. 24, 2014; 4 pages.

*Primary Examiner* — Charles Swift
(74) *Attorney, Agent, or Firm* — Armstrong Teasdale LLP

(57) ABSTRACT

A system includes a first computing device including a virtual machine (VM), a second computing device, and a third computing device coupled to the first computing device and to the second computing device. The third computing device includes a management module configured to create a backup image of the VM while the VM is executing on the first computing device, create at least one delta file for use in storing changes to the VM that occur after the backup image is created, and copy the backup image to the second computing device while the VM is executing. The management module is also configured to suspend the VM on the first computing device after the backup image has been copied to the second computing device, and execute the VM on the second computing device using the backup image and the at least one delta file.

20 Claims, 4 Drawing Sheets

(56) References Cited

U.S. PATENT DOCUMENTS

| | | |
|---|---|---|
| 2010/0262586 A1 | 10/2010 | Rosikiewicz et al. |
| 2010/0262797 A1 | 10/2010 | Rosikiewicz et al. |
| 2010/0306354 A1* | 12/2010 | DeHaan et al. ............... 709/222 |
| 2011/0010515 A1 | 1/2011 | Ranade |
| 2011/0085667 A1* | 4/2011 | Berrios et al. ................ 380/282 |
| 2011/0185292 A1* | 7/2011 | Chawla et al. ................ 715/760 |
| 2012/0011509 A1* | 1/2012 | Husain .............................. 718/1 |
| 2012/0089666 A1* | 4/2012 | Goswami et al. ............. 709/203 |
| 2012/0151477 A1* | 6/2012 | Sinha et al. ....................... 718/1 |
| 2012/0209812 A1* | 8/2012 | Bezbaruah et al. ........... 707/646 |
| 2012/0221529 A1 | 8/2012 | Rosikiewicz et al. |
| 2012/0278726 A1* | 11/2012 | Halperin et al. ............... 715/742 |
| 2013/0055240 A1* | 2/2013 | Gondi ............................... 718/1 |
| 2013/0138791 A1* | 5/2013 | Thomas et al. ................ 709/223 |
| 2013/0150126 A1* | 6/2013 | Pattaswamy et al. ......... 455/558 |
| 2013/0212579 A1* | 8/2013 | Ben-Shaul et al. ............... 718/1 |
| 2013/0212580 A1* | 8/2013 | Glaser et al. ...................... 718/1 |
| 2013/0235874 A1* | 9/2013 | Ringdahl et al. ......... 370/395.53 |
| 2013/0262250 A1* | 10/2013 | Lingafelt et al. .............. 705/26.1 |
| 2013/0268588 A1* | 10/2013 | Chang et al. .................. 709/204 |
| 2013/0326503 A1* | 12/2013 | De et al. ............................ 718/1 |
| 2014/0040888 A1* | 2/2014 | Bookman et al. ................. 718/1 |

* cited by examiner

SYSTEMS AND METHODS FOR MIGRATING VIRTUAL MACHINES

BACKGROUND

The field of the disclosure relates generally to computing systems, and more specifically, to systems and methods for migrating virtual machines.

At least some known computing devices are arranged in a network to share data and resources between the computing devices. To enable a plurality of users to access the data and/or resources, a virtualized computing environment may be established in which one or more virtual machines are executed on the computing devices. In such a network, the users may each access different virtual machines that share computing resources of one computing device, for example.

The virtual machines may be imaged or backed up to one or more remote storage devices and/or may be migrated to different computing devices in an attempt to balance resource usage among the computing devices and/or to increase a reliability of the network system. However, depending on the amount of data associated with such virtual machines, for example, such imaging and/or migrating the virtual machines may cause the virtual machines to be inaccessible to the users for undesirably long periods of time.

BRIEF DESCRIPTION

In one aspect, a system is provided that includes a first computing device including a virtual machine (VM), a second computing device, and a third computing device coupled to the first computing device and to the second computing device. The third computing device includes a management module configured to create a backup image of the VM while the VM is executing on the first computing device, create at least one delta file for use in storing changes to the VM that occur after the backup image is created, and copy the backup image to the second computing device while the VM is executing. The management module is also configured to suspend the VM on the first computing device after the backup image has been copied to the second computing device, and execute the VM on the second computing device using the backup image and the at least one delta file.

In another aspect, a method of migrating a virtual machine (VM) from a first computing device to a second computing device is provided. The method includes creating, by a management module executing on a processor, a backup image of the VM while the VM is executing on the first computing device, creating, by the management module, at least one delta file for use in storing changes to the VM that occur after the backup image is created, and copying, by the management module, the backup image to the second computing device while the VM is executing. The method also includes suspending, by the management module, the VM on the first computing device after the backup image has been copied to the second computing device, and executing the VM on the second computing device using the backup image and the at least one delta file.

The features, functions, and advantages that have been discussed can be achieved independently in various configurations or may be combined in yet other configurations, further details of which can be seen with reference to the following description and drawings.

DETAILED DESCRIPTION

Figure 1:
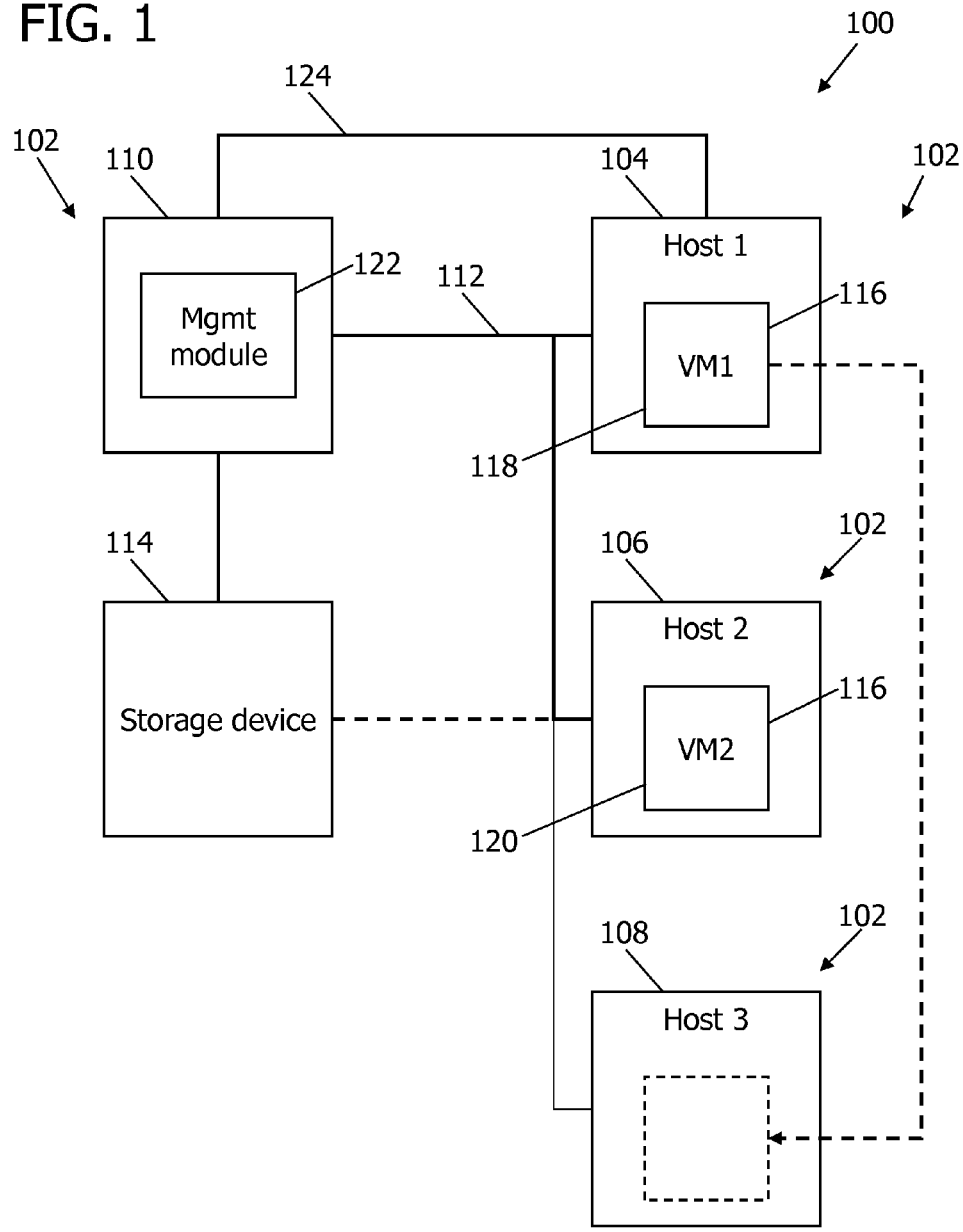
FIG. 1 illustrates an exemplary network system that includes a plurality of exemplary computing devices.

FIG. 1 is a block diagram of an exemplary network system 100. In the exemplary configuration, network system 100 includes one or more host computing devices 102 (also referred to herein as "hosts"), such as a first host 104, a second host 106, and a third host 108. Moreover, in the exemplary configuration, network system 100 also includes a fourth host computing device 110 (hereinafter referred to as a "management device") that is coupled to hosts 102 via a network 112, and one or more storage devices 114 that are communicatively coupled to management device 110 and to hosts 102, for example, via network 112. Alternatively, one or more subnetworks may be used to couple hosts 102, management device 110, and storage devices 114 together. While three hosts 102 are illustrated in FIG. 1, it should be recognized that any suitable number of hosts 102 may be included within network system 100.

In the exemplary configuration, hosts 102 are physical computing devices, such as servers or other computers, that execute a virtual execution environment in which one or more virtual machines ("VMs") 116 are instantiated and executed. Alternatively, one or more hosts 102 may be virtual computing devices, such as virtual servers or other virtual computers, that execute within a virtual execution environment of one or more physical computing devices.

In the exemplary configuration, hosts 102 and VMs 116 are part of a virtual infrastructure within network system 100. In one configuration, the virtual infrastructure is at least partially implemented using the ESXi hypervisor infrastructure provided by VMware, Inc., of Palo Alto, Calif. Alternatively, any suitable hypervisor or other infrastructure may be used within network system 100. For example, each host 102 may execute an ESXi brand hypervisor, or another hypervisor or infrastructure, to enable VMs 116 to be instantiated and executed within host 102.

Each VM 116 includes an operating system (OS) and may include one or more applications (neither shown) that may be executed within VM 116. For example, a user of VM 116 may remotely connect to host 102 and execute one or more applications within VM 116. While two VMs 116 (i.e., a first VM 118 and a second VM 120) are illustrated within FIG. 1, it should be recognized that any suitable number of VMs 116 may be included within network system 100. Moreover, in the exemplary configuration, each VM 116 includes a plurality of files that store data associated with VM 116. For example, each VM 116 includes, without limitation, a VM disk file that stores data for the files associated with VM 116, and one or more configuration files that include operational or configuration settings for VM 116. Each VM 116 may include one or more "snapshots," or backup images, of the files associated with VM 116, such as the VM disk file. Each snapshot includes one or more associated delta files that include changes to VM # and/or the VM disk file that have not been incorporated into the VM disk file (or into other files associated with VM 116). The files and/or the snapshots of VM 116 may be stored within host 102, and/or may be stored within one or more storage devices 114.

Storage devices 114 includes, for example, one or more hard drives, solid state drives, and/or any other device that stores files, such as files associated with VMs 116. Storage devices 114 may be arranged in a network attached storage (NAS) configuration, a storage area network (SAN), and/or any other configuration that enables network system 100 to function as described herein.

Management device 110 includes a management module 122 for controlling and/or administering network system 100, such as hosts 102 and VMs 116. In the exemplary configuration, management device 110 executes a LINUX-based operating system, and management module 122 is a LINUX-based program executing within the operating system. Management module 122 facilitates enabling VMs 116 to be backed up, restored, migrated, suspended, resumed, cloned, inventoried (i.e., to obtain information about storage, networking, operating system, etc.) and upgraded within network system 100, as described more fully herein. For example, management module 122 enables first VM 118 to be migrated from first host 104 to third host 108. Accordingly, after first VM 118 has been migrated to third host 108, first VM 118 may begin executing within third host 108.

Network 112 communicatively couples hosts 102, management device 110, and/or storage devices 114 together. In the exemplary configuration, network 112 is a wired gigabit Ethernet network. Alternatively, network 112 may be any other wired or wireless network that enables network system 100 to function as described herein. In one configuration, management device 110 is coupled to one or more hosts 102, such as first host 104, by a second network 124, such as a 10 gigabit Ethernet network 124.

Figure 2:
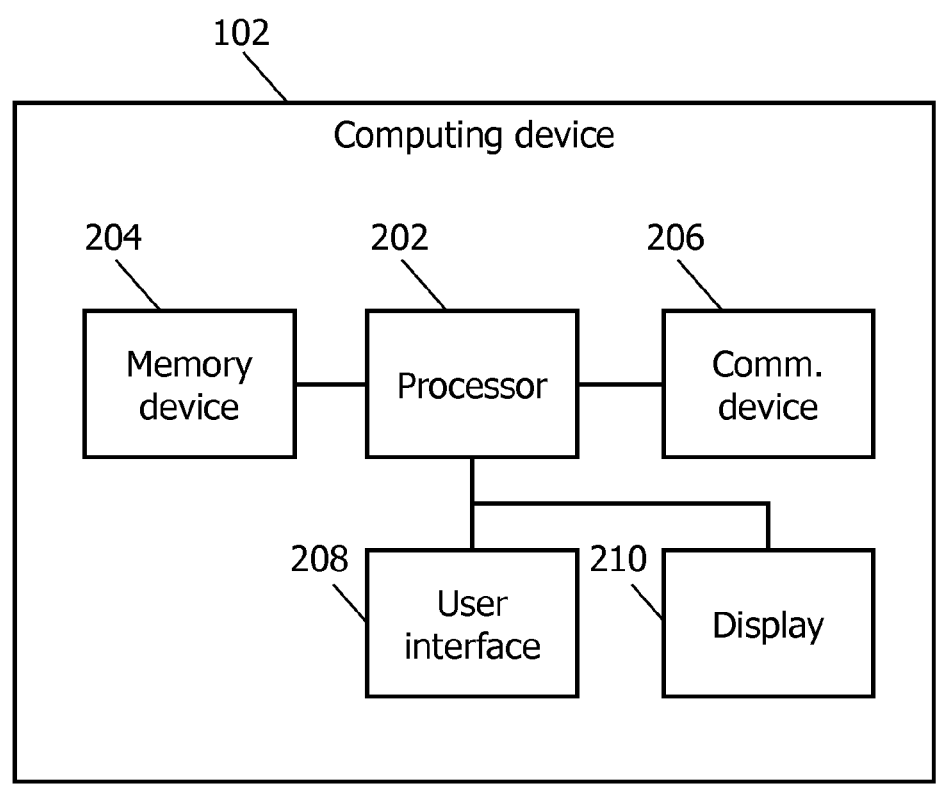
FIG. 2 is a block diagram of an exemplary computing device that may be used with the network system shown in FIG. 1.

FIG. 2 is a block diagram of an exemplary computing device 102 that may be used with network system 100 (shown in FIG. 1). For example, one or more of hosts 102, management device 110, management module 122, and VMs 116 may be implemented as, and/or executed by, one or more computing devices 102. In the exemplary configuration, computing devices 102 include one or more processors 202, memory devices 204, communication devices 206, user interfaces 208, and/or displays 210. It should be recognized that, in certain configurations, computing devices 102 may not include one or more components described herein. For example, a computing device 102 may be a rack-mounted server that does not include user interface 208 and display 210.

Processor 202 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 204 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary configuration, memory device 204 includes data and/or instructions that are executable by processor 202 (i.e., processor 202 is programmed by the instructions) to enable processor 202 to perform the functions described herein.

Communication device 206 may include, without limitation, a network interface controller (NIC), a network adapter, a transceiver, and/or any other communication device that enables network system 100 to operate as described herein. Communication device 206 may connect to network 112 using any suitable communication protocol. In the exemplary configuration, network 112 and communication device 206 use a wired Ethernet protocol.

User interface 208 includes, without limitation, a keyboard, a keypad, a touch-sensitive screen, a mouse, a scroll wheel, a pointing device, an audio input device employing speech-recognition software, and/or any suitable device that enables a user to input data into communication device 206 and/or retrieve data from communication device 206. Display 210 includes, without limitation, a liquid crystal display (LCD), a vacuum fluorescent display (VFD), a cathode ray tube (CRT), a plasma display, a light-emitting diode (LED) display, and/or any suitable visual output device capable of displaying graphical data and text to a user.

Figure 3:
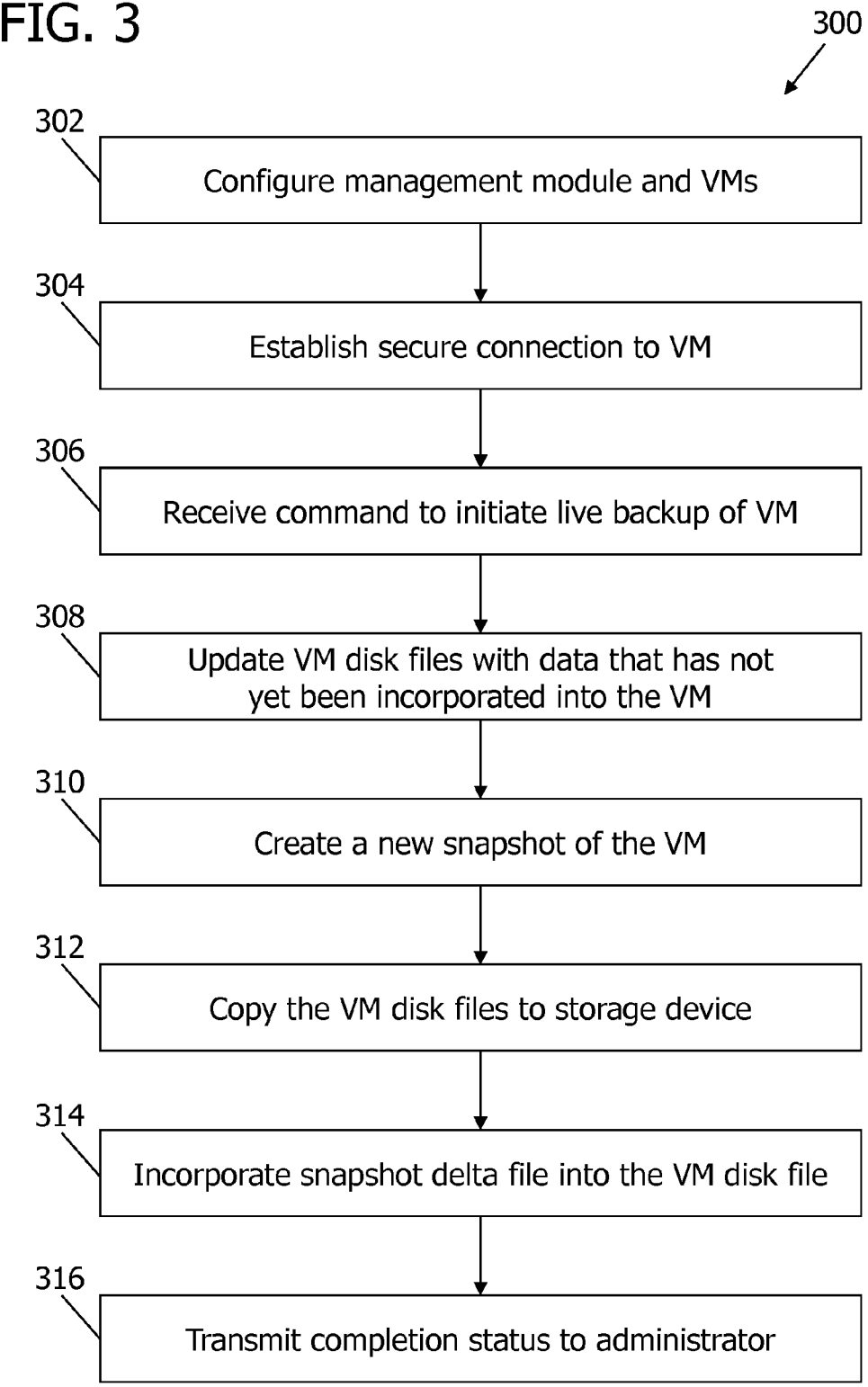
FIG. 3 is a flow diagram of an exemplary method of imaging a virtual machine that may be executed by the network system of FIG. 1.

FIG. 3 is a flow diagram of an exemplary method 300 of imaging, or saving a state of, a VM 116 executing on a host 102 within network system 100 (each shown in FIG. 1). In the exemplary configuration, method 300 is embodied within a plurality of computer-executable instructions (e.g., management module 122) that program processor 202 of management device 110 to perform the functions described herein. Accordingly, in the exemplary configuration, method 300 is at least partially executed by processor 202 of management device 110.

In the exemplary configuration, management module 122 and VMs 116 are configured 302 by receiving one or more inputs, e.g., through user interface 208 and/or through one or more configuration files, such as through a scheduler such as cron. For example, management module 122 and VMs 116 (and the hypervisors and hosts 102 associated with VMs 116) are configured to enable a secure connection protocol, such as secure shell (SSH), to be used for communication therebetween.

Moreover, an asymmetric cryptographic key exchange is performed using a public key and a private key for management device 110 and/or for the session in which method 300 is performed. The private key is stored within management module 122 and the public key is transmitted to each host 102 that management module 122 will connect to. The public key is used to encrypt data transmitted to management module 122, and the private key is used by management module 122 to decrypt the data.

A secure connection to each VM 116 is established 304, for example, using the secure communication protocol and the cryptographic keys. Moreover, a command is received 306 by management module 122 (e.g., from an administrator or user using management module 122) to initiate a live backup, or a live backup operation, of VM 116. In the exemplary configuration, the live backup operation does not require an outage or a suspension of VM 116. Moreover, in the exemplary configuration, a single command may be entered to automate the live backup of VM 116. In such a configuration, management module 122 references predetermined response data and automatically responds to prompts received during the live backup operation using the response data and without using or requiring user input.

Management module 122 stores a copy of the VM configuration files, such as a VMX file, and updates 308 the VM disk files with data that has not yet been incorporated into VM 116. For example, if a snapshot of VM 116 includes data that has not been incorporated into the VM disk file, management module 122 causes the data to be incorporated into the VM disk file (and any other files as appropriate), and removes the snapshot files.

Management module 122 creates 310 a new snapshot of VM 116 such that any changes to VM 116 are stored in the snapshot delta file rather than the VM disk file. Since the VM disk files are no longer active, management module 122 copies 312 the VM disk files to storage device 114, for example, using a secure copy command. In one configuration, one or more "bootbank" and/or system archive files are copied to storage device 114 as well in case an administrator is prevented from later accessing host 102 and/or VM 116.

After the VM disk file (and any other associated files) have been copied to storage device 114, the snapshot delta file is incorporated 314 into the VM disk file (and/or any other file associated with VM 116). The configuration file, such as the VMX file, is restored and a status, such as a successful completion status, is transmitted 316 to an administrator or another user who initiated the live backup operation.

In one configuration, the backed up, or snapshotted, state of VM 116 may be redeployed as a new VM 116 on a new host 102, such as second host 106 (shown in FIG. 1). More particularly, a point-in-time backup may be used to clone, or redeploy, VM 116. In such a configuration, the most recent snapshot is copied to the new host 102 and the file structure of the new VM 116 is renamed according to a naming structure input by the administrator or received from a configuration file.

Figure 4:
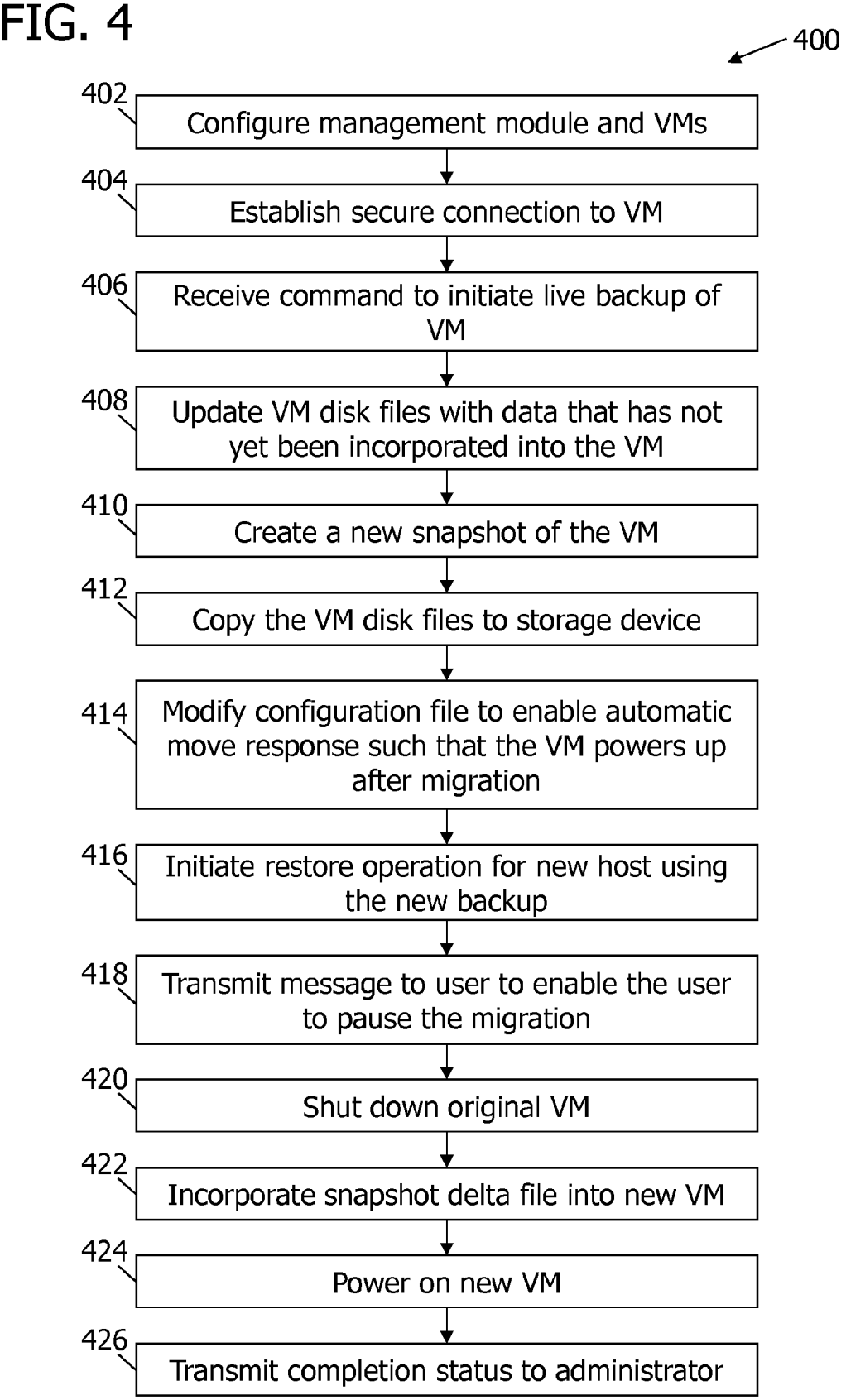
FIG. 4 is a flow diagram of an exemplary method that may be executed by the network system of FIG. 1 to migrate a virtual machine from a first computing device to a second computing device.

FIG. 4 is a flow diagram of an exemplary method 400 of migrating a VM 116 executing on a first host 104 to a second host 106 within network system 100 (each shown in FIG. 1). In the exemplary configuration, method 400 is embodied within a plurality of computer-executable instructions (e.g., management module 122) that program processor 202 of management device 110 to perform the functions described herein. Accordingly, in the exemplary configuration, method 400 is at least partially executed by processor 202 of management device 110.

In the exemplary configuration, management module 122 and VMs 116 are configured 402 by receiving one or more inputs, e.g., through user interface 208 and/or through one or more configuration files. For example, management module 122 and VMs 116 (and the hypervisors and hosts 102 associated with VMs 116) are configured to enable a secure connection protocol, such as secure shell (SSH), to be used for communication therebetween.

Moreover, an asymmetric cryptographic key exchange is performed using a public key and a private key for management device 110 and/or for the session in which method 400 is performed, in a similar manner as described above with reference to FIG. 3. A secure connection to each VM 116 is established 404, for example, using the secure communication protocol and the cryptographic keys. Moreover, a command is received 406 by management module 122 (e.g., from an administrator or user using management module 122) to initiate a migration, or a migration operation, of VM 116. In the exemplary configuration, a single command may be entered to automate the migration of VM 116. In such a configuration, management module 122 references predetermined response data and automatically responds to prompts received during the migration of VM 116 using the response data without using or requiring user input. In the exemplary configuration, the migration of VM 116 to a new host 102 (e.g., third host 108 illustrated in FIG. 1) only requires an outage or a suspension of VM 116 for a time that is required to transfer any delta files (described herein) to the new host 102 and to incorporate the delta file into the disk file of VM 116 on the new host 102. Accordingly, the outage/suspension of VM 116 is facilitated to be reduced as compared to at least some known systems.

Management module 122 stores a copy of the VM configuration files, such as a VMX file, and updates 408 the VM disk files with data that has not yet been incorporated into VM 116. For example, if a snapshot of VM 116 includes data that has not been incorporated into the VM disk file, management module 122 causes the data to be incorporated into the VM disk file (and any other files as appropriate), and removes the snapshot files.

While VM 116 is executing, management module 122 creates 410 a new snapshot of VM 116 such that any changes to VM 116 are stored in the snapshot delta file rather than the VM disk file. Since the VM disk files are no longer active, management module 122 copies 412 the VM disk files to storage device 114, for example, using a secure copy command.

A local configuration file, such as a local VMX file, is modified 414 to enable prompts received during the migration of VM 116 to be automatically responded to, or automatically answered. More particularly, the local VMX file may be configured such that the new host 102 accepts the migrated VM 116 as moved rather than copied. The network ports of VM 116 are identified using an auto-sense routine and are stored in a configuration file for use in recreating the network ports of the migrated VM 116.

The auto-sense routine may include comparing a configuration defined by the local VMX file with a configuration on the new host 102. More particularly, if (1) the local VMX network location is not equal to "VM #1 PortGroup #1", (2) the "VM #1 PortGroup #1" is not undefined, (3) the IP address associated with the local VMX file returns ICMP pings, and (4) the IP address associated with the local VMX file is found in DNS, then the target port group of the new host configuration replaces the local VMX file network location. A match may be found by comparing other VMs and/or other PortGroups. The default target port group may be used if no match is identified and if the local VMX network location is not equal to the default PortGroup, the default PortGroup is defined, and the default PortGroup is defined on the target host. By configuring the network location of the local VMX file, network availability after migration may be improved.

After the VM disk file (and any other associated files) have been copied to storage device 114, a restore operation is initiated 416 in which the most recent backup or image for VM 116 within storage device 114 (i.e., the snapshot created 410 above) is restored on the new host 102. Accordingly, the VM disk files (and any other associated files) are securely copied from storage device 114 to the new host 102 while VM 116 is executing.

Management module 122 transmits 418 a message or a notification to the user of VM 116 (e.g., to a user of one or more applications executing on VM 116) indicating that a suspension or an outage of VM 116 may occur at a predetermined time unless the user pauses or delays the suspension or outage. For example, the user may pause or delay the suspension or outage by pressing a designated key on a keyboard or by causing any designated input to be entered. The user may pause and/or resume a migration operation prior to shutdown of VM 116 should a backup or restore operation complete prior to a scheduled outage start window. In one configuration, the message or notification identifies an expected duration of the suspension or outage based on a size of the snapshot delta file and an expected time required to transmit and/or incorporate the snapshot delta file into the migrated VM 116. Depending on the size of the snapshot delta file and an amount and/or type of activity reflected therein, the expected duration of the suspension or outage may be about one minute or even less.

Management module 122 shuts down 420 the original VM 116 and stores the snapshot delta files in storage device 114. It should be recognized that, as used herein, the term "shutting down" a VM also includes suspending the VM, and the terms are used synonymously. In addition, the snapshot delta files are transmitted to the new host 102 and are incorporated 422 into the new VM 116 (i.e., the VM files copied from storage device 114). It should be recognized that VM 116 is shut down, or suspended, for a time that includes a time required to transmit the delta file (or files) to the new VM 116 but that does not include a time required to transmit larger core image files to the new VM 116. In other words, VM 116 is not required to be suspended for the entire duration of the transfer of files to the new VM 116. Rather, VM 116 may be only suspended for the time required to transfer and/or incorporate the delta files in the new VM 116 (i.e., into the snapshot image copied to the new host 102).

The new VM 116 is added to an inventory of the new host 102 and the new VM 116 is powered on 424 (also referred to as initiated or executed). The original VM 116 is removed from the original, or source, VM 116. A status, such as a successful completion status, is transmitted 426 to an administrator or another user who initiated the migration operation and the new VM 116 begins operation on the new host 102.

In some implementations, all VMs 116 on storage device 114, or within a datastore, may be migrated from one host 102 to another host 102. In such an implementation, management module 122 may create one or more virtual switches, virtual network interface cards, and any other element needed to maintain connectivity after the migration. Thus, overall outage time may be reduced. In some implementations, redeploying or cloning images of VM 116 from a certified or vetted security baseline satisfies or negates requirements to perform per-VM security certifications.

A technical effect of the methods and systems described herein includes at least one of: (a) creating, by a management module executing on a processor, a backup image of a VM while the VM is executing on a first computing device; (b) creating, by a management module, at least one delta file for use in storing changes to a VM that occur after a backup image is created; (c) copying, by a management module, a backup image to a second computing device while a VM is executing; (d) suspending, by a management module, a VM on a first computing device after a backup image has been copied to a second computing device; and (e) executing a VM on a second computing device using a backup image and at least one delta file.

The configurations described herein provide an efficient and robust network system that enables virtual machines (VMs) to be backed up, restored, and migrated to new computing devices and/or storage devices in an efficient manner. To migrate the VM from a first computing device to a second computing device, the files of the VM are imaged, or snapshotted, and one or more delta files are created to store changes to the VM files after the files have been imaged. Since any changes to the VM files are temporarily stored in the delta file, other VM files, such as one or more VM disk files, are transmitted to the second computing device while the VM is executing. After the VM files have been transmitted to the second computing device, the VM executing on the first computing device is suspended and any delta files are transmitted to the second computing device. After the transmittal of the delta files is complete, the delta files are incorporated into the VM files that were transmitted earlier to the second computing device. The VM is then initiated or executed on the second computing device. As such, the VM is not required to be suspended while the VM files are transmitted to the second computing device. Rather, as described herein, the VM on the first computing device is only required to be suspended while the delta files (typically much smaller) are transmitted to the second computing device and incorporated into the VM files on the second computing device. As a result, migration times may be reduced.

Exemplary systems and methods for migrating virtual machines are described above in detail. The systems and the methods are not limited to the specific configurations described herein but, rather, components of the systems and/or steps of the methods may be utilized independently and separately from other components and/or steps described herein. Further, the described operations and/or components may also be defined in, or used in combination with, other systems, methods, and/or networks, and are not limited to practice with only the network system as described herein.

The systems described herein are not intended to suggest any limitation as to the scope of use or functionality of any aspect of the disclosure. In addition, the systems described herein should not be interpreted as having any dependency or requirement relating to any one or combination of components illustrated in the exemplary operating environment.

The order of execution or performance of the operations in the disclosure illustrated and described herein is not essential, unless otherwise specified. That is, the operations may be performed in any order, unless otherwise specified, and the disclosure may include additional or fewer operations than those disclosed herein. For example, it is contemplated that executing or performing a particular operation before, contemporaneously with, or after another operation is within the scope of aspects of the disclosure.

Although specific features of various configurations may be shown in some drawings and not in others, this is for convenience only. In accordance with the principles of the disclosure, any feature of a drawing may be referenced and/or claimed in combination with any feature of any other drawing.

This written description uses examples to disclose various configurations, which include the best mode, to enable any person skilled in the art to practice those configurations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    a first physical computing device comprising a virtual machine (VM);
    a second physical computing device; and
    a third physical computing device coupled to said first computing device and to said second computing device, said third computing device comprising a management module configured to:
    create a backup image of the VM while the VM is executing on said first computing device;
    create at least one delta file for use in storing changes to the VM that occur after the backup image is created;
    identify one or more network ports of the VM;
    store the one or more network ports in a configuration file associated with the backup image, for use by said second computing device in recreating the one or more network ports;

copy the backup image to said second computing device while the VM is executing on said first computing device;

suspend the VM on said first computing device after the backup image has been copied to said second computing device and during incorporation of the at least one delta file into the backup image on said second computing device;

remove the VM from said first physical computing device; and execute the VM on said second computing device using the backup image and the at least one delta file.

2. A system in accordance with claim 1, wherein said third computing device executes a LINUX based operating system, said management module is a LINUX program executing within the LINUX based operating system.

3. A system in accordance with claim 1, wherein said management module is further configured to establish a secure connection with said first computing device using an asymmetric key exchange.

4. A system in accordance with claim 1, wherein said first computing device is a virtual host computing device executing on at least one physical computing device.

5. A system in accordance with claim 1, wherein said management module is further configured to:
receive at least one prompt from said second computing device; and
automatically respond to the at least one prompt without input from a user.

6. A system in accordance with claim 1, wherein the VM is configured to execute at least one application, said management module further configured to cause a notification to be presented to a user of the at least one application to notify the user that the VM will be suspended at a predetermined time.

7. A system in accordance with claim 6, wherein said management module is further configured to enable the user to delay the suspension of the VM.

8. A system in accordance with claim 1, wherein said management module is further configured to transmit the at least one delta file to said second computing device after the VM is suspended.

9. A system in accordance with claim 8, wherein said management module is further configured to suspend the VM for a time that includes a time required to transmit the at least one delta file to said second computing device but that does not include a time required to transmit the backup image to said second computing device.

10. A system in accordance with claim 1, wherein said management module is further configured to modify the configuration file such that said second computing device accepts the VM as moved rather than copied.

11. A method of migrating a virtual machine (VM) from a first computing device to a second computing device, said method comprising:
creating, by a management module executing on a processor, a backup image of the VM while the VM is executing on the first computing device;
creating, by the management module, at least one delta file for use in storing changes to the VM that occur after the backup image is created;
identifying one or more network ports of the VM;
storing the one or more network ports in a configuration file associated with the backup image, for use by the second computing device in recreating the one or more network ports;
copying, by the management module, the backup image to the second computing device while the VM is executing on the first computing device;
suspending, by the management module, the VM on the first computing device after the backup image has been copied to the second computing device and during incorporation of the at least one delta file into the backup image on the second computing device;
removing the VM from said first computing device; and
executing the VM on the second computing device using the backup image and the at least one delta file.

12. A method in accordance with claim 11, further comprising executing the management module within a LINUX based operating system.

13. A method in accordance with claim 11, further comprising establishing a secure connection between the management module and the first computing device using an asymmetric key exchange.

14. A method in accordance with claim 11, further comprising executing the first computing device as a virtual host computing device that executes on at least one physical computing device.

15. A method in accordance with claim 11, further comprising:
receiving at least one prompt from the second computing device; and
automatically responding to the at least one prompt without input from a user.

16. A method in accordance with claim 11, wherein the VM is configured to execute at least one application, said method further comprising presenting, to a user of the at least one application, a notification that the VM will be suspended at a predetermined time.

17. A method in accordance with claim 16, further presenting the user with an option to delay the suspension of the VM.

18. A method in accordance with claim 11, further comprising transmitting the at least one delta file to the second computing device after the VM is suspended.

19. A method in accordance with claim 18, further comprising suspending the VM for a time that includes a time required to transmit the at least one delta file to the second computing device but that does not include a time required to transmit the backup image to the second computing device.

20. A method in accordance with claim 11, further comprising modifying the configuration file such that the second computing device accepts the VM as moved rather than copied.

* * * * *